3,021,257
PAPER CONTAINING PIGMENT OR FILLER

Walter H. Stauffenberg, Doylestown, Pa., assignor to American Cyanamid Company, New York, N.Y., a corporation of Maine
No Drawing. Filed July 31, 1958, Ser. No. 752,169
10 Claims. (Cl. 162—162)

The present invention relates to the manufacturers of pigmented paper. More particularly, the invention relates to a method for increasing the pigment content of paper.

In the past, pigmented paper has generally been prepared by forming an aqueous suspension of papermaking cellulose fibers, adding thereto one or more pigments, uniformly distributing the pigment through the suspension, adding alum, sheeting the suspension to form a waterlaid web, and drying the web.

Ordinary pigments have no substantivity for cellulose fibers and their retention in the waterlaid web is due to the fact that they are mechanically filtered from the aqueous phase by the fibers as they are sheeted. The pores between fibers are large so that in the absence of filter-aid material a large proportion of the pigment is lost. The alum added in the process forms a floc which acts as filter aid.

A major advance in the art of manufacture of pigmented paper is disclosed in U.S. Patent No. 2,730,446, granted on January 10, 1956, to M. C. Hutchins. This patent discloses that paper of increased color value can be prepared by addition of a cationic resin to the fibrous cellulose suspension prior to forming the sheet. Evidently the resin modifies the electrostatic properties of the fiber so that pigment is substantively deposited on the fibers while the fibers are in aqueous suspension. In the process, however, only a part of the pigment is deposited on the fibers in this manner, the remainder of the pigment remaining in suspension.

The discovery has now been made that a further increase in the amount of pigment substantively deposited on the fibers may be effected by post-treating the aqueous suspension with an anionic polymer. According to the present invention, a small amount of a water-soluble anionic polymer is added to the pulp after the action of the cationic resin is complete. By means of this step I have succeeded in the laboratory in increasing the amount of pigment in the paper by more than 50% as compared with the amount that would otherwise be present, and in large scale practice the invention has permitted savings of as much as about 33% in the amount of pigment needed to produce a desired effect, for example, a given depth of color.

The process of the present invention has been applied satisfactorily to water-dispersible pigments, both inorganic (titanium dioxide, calcium carbonate and chrome yellow) and organic (barium lithol red and benzidine orange). Evidently the invention does not depend on the particular pigment used, and the application of additional hydrophilic pigments (e.g., clay, ultramarine, Prussian blue, the ochres, and lead chromates) is within the scope of the invention.

As cationic polymers there may be used the melamine-formaldehyde acid colloid and the urea-formaldehyde condensates referred to in the Hutchins patent. In general, any water-soluble cationic polymer may be used, and thus in addition there may be advantageously used the more recently developed cationic product formed by reacting a very high molecular weight polyalkylenepolyamine first with a cyanate and then with formaldehyde as disclosed in U.S. Patent No. 2,834,756 granted to T. J. Suen et al. on May 13, 1958. Such products work well at neutral or alkaline pH values and thus are particularly valuable in connection with acid-sensitive pigments such as calcium carbonate and ultramarine.

Between about ⅛% and 3%–5% of cationic polymer is added, based on the dry weight of the fibers, as disclosed in the Hutchins patent, larger amounts being generally unnecessary. The polymer is added with stirring, and sufficient time (roughly ½ minute) should be allowed for its action to become substantially complete.

Likewise any water-soluble anionic polymer can be used. Suitable polymers are made by copolymerization of a water-soluble anionic monomer, e.g., acrylic acid, methacrylic acid, sulfostyrene, or vinyl benzoic acid, with a water-soluble neutral monomer, e.g., acrylamide, methacrylamide, or acrolein. Similar polymers may be prepared by reacting styrene and maleic anhydride (1:1 molar ratio) followed by hydrolysis in sodium hydroxide, partially hydrolyzing a material such as polyethyl acrylate, or by copolymerizing vinyl acetate and ethyl acrylate followed by hydrolysis.

There may further be used the anionic urea-aldehyde resin disclosed in U.S. Patent No. 2,559,578, granted on July 10, 1951, to T. J. Suen.

An effective amount of anionic resin is added to cause increased deposition of the pigment on the fibers, but an excess causes no harm. The resins (both cationic and anionic) are preferably added as dilute (1%–12%) solutions to facilitate metering and uniform distribution through the fibrous suspension. The invention does not primarily depend on the identity of the particular resins used or on the amounts thereof that are added.

In mills where the pigment is added at the beater, the cationic resin may be added therewith or at any point more than about one minute from the wire. In such mills the anionic resin may be added at any time after adsorption of the cationic resin by the fibers has become substantially complete, but sufficiently far from the wire to permit deposition of the residual pigment on the fibers before the sheeting step begins.

In mills where the paper pulp suspension is given heavy refining, the pigment may be added to the beater, the cationic resin may be added to the refiner effluent, and the anionic resin to the screen effluent sufficiently ahead of the wire so that deposition becomes substantially complete before the sheeting step.

The anionic resin may not be added in advance of or with the cationic resin, otherwise comparatively poor results will be obtained. However, the pigment may be added at any point ahead of the anionic resin or even simultaneously therewith. Thereafter the fibers are sheeted to form a waterlaid web and the web is dried in customary manner.

When sized paper is desired, it is generally best to add the rosin size and pigment first to the beater, followed by addition of alum to set the size, after which the cationic and anionic resins may be added as described above.

The invention will be further described by the examples which follow. These examples are specific embodiments of the invention and are not to be construed as limitations thereon.

EXAMPLE 1

The following illustrates the effect of an anionic polymer, used according to the present invention, in improving the amount of a white inorganic pigment carried into the paper.

An aqueous suspension of bleached sulfite fibers beaten to a Canadian freeness of 300 ml. was prepared at a consistency of 0.6% and to this was added with vigorous stirring 10%, based on the dry weight of the fibers, of titanium dioxide pigment (water-dispersible paper-making grade). The pigment uniformly dispersed in the aqueous phase. The pH of the pulp was adjusted to pH 4.5 and then there was added with moderate stirring 2% (resin solids calculated as melamine based on the dry weight of the fibers) of the cationic melamine-formaldehyde acid colloid of U.S. Patent No. 2,345,543 diluted to a 2% by weight aqueous solution. A part of the pigment was deposited on the fibers, and the grainy appearance of the aqueous phase changed to milky.

Two aliquots were removed from the pulp. One was reserved as control, and to this nothing was added. To the second was added with moderate stirring 0.5% (resin solids based on the dry weight of the fibers) of a 90:10 molar ratio anionic acrylamide:acrylic acid copolymer prepared by copolymerizing the monomers in the presence of a persulfate catalyst to a molecular weight of about 500,000 (calculated by Staudinger method). The aqueous phase lost its milky appearance in less than 30 seconds.

The aliquots were formed into handsheets at 50 lb. basis weight and dried to uniform weight by standard laboratory method. The amount of pigment retained in each instance was determined by ashing the sheets under air followed by weighing the ash residues thus obtained. Results are as follows:

*Pulp treatment*

| Run No. | Percent $TiO_2$ | Percent M-F [1] Resin | Percent AM-AA [2] Copolymer | Percent $TiO_2$ In Sheet |
|---|---|---|---|---|
| 1 | 10 | 2 | None | 4.70 |
| 2 | 10 | 2 | 0.5 | 7.35 |

[1] M-F=melamine-formaldehyde.
[2] AM-AA=acrylamide-acrylic acid.

The results show that addition of the anionic copolymer caused a 56.5% increase in the weight of pigment in the paper.

EXAMPLE 2

The following illustrates the improvement effected by the process of the present invention using a colored inorganic pigment.

The procedure of Example 1 was repeated except that chrome yellow was used as the pigment and the comparative pigment content of the paper samples was determined by measuring the yellowness of the sheets using a standard chrome yellow pigmented sheet as control.

An additional set of handsheets was prepared and tested by the foregoing method except that 3% of alum (aluminum sulfate tetradecyl hydrate, based on the dry weight of the fibers) was added as a 10% aqueous solution after the cationic resin and before the anionic polymer. Results are as follows:

| Run No. | Percent Chrome Yellow | Percent M-F [1] Resin | Percent Alum | Percent AM-AA [2] Polymer | Pigment Content of Paper [3] | | |
|---|---|---|---|---|---|---|---|
| | | | | | Wire Side | Felt Side | Average |
| 1—standard | 5 | None | 3 | None | 100 | 100 | 100 |
| 2 | 5 | 2 | None | None | 164 | 158 | 161 |
| 3 | 5 | 2 | None | 0.5 | 212 | 188 | 200 |
| 4 | 5 | 2 | 3 | 0.5 | 222 | 200 | 211 |

[1] M-F=melamine-formaldehyde.
[2] AM=acrylamide; AA=acrylic acid.
[3] Determined on Hardy type recording spectrophotometer operating with blue light of 460mμ using "R" cam, as described by Roland E. Derby, Jr., in American Dyestuff Reporter, pages 550–557, September 19 52.

Comparison of run 2 with run 3 shows that addition of the anionic resin improved the effect of the pigment by about 25%. Comparison of run 3 with run 4 shows that the presence of alum during addition of the anionic resin was not harmful but actually produced a further increase in reflectance.

EXAMPLE 3

The following illustrates the large scale application of the process of the present invention in a continuous papermaking process.

To a beater charge of 900 lbs. of kraft pulp at 3.5% consistency was added 110 lb. of a 20% solids water-dispersible paste of barium lithol red (C.I. 189). The charge was beaten for two hours, passed through a refiner and run through a regulator box and trough where the pulp was diluted to a consistency of 1.6% by addition of returned white water. About 5% of melamine-formaldehyde acid colloid (resin solids on the dry weight of the fibers) was run in to the pulp at a point 2 minutes from the Fourdrinier wire. The pulp was then diluted to 0.6% consistency by addition of a further amount of returned white water. Then the anionic 90:10 molar ratio acrylamide:acrylic acid copolymer of Example 1 as a 2% by weight aqueous solution (0.55% of polymer on the dry weight of the fibers) was run in to the pulp at a point one minute from the wire.

The paper obtained was indistinguishable from corresponding paper made by addition of 140 lb. of the pigment paste to the beater with addition of the cationic resin but without addition of anionic polymer.

In a subsequent run the amount of anionic resin added was decreased to 1/16 of 1%. Even this amount caused a perceptible deepening of the shade.

EXAMPLE 4

The procedure of Example 3 was repeated except that the pigment paste was replaced by 80 lb. of a 25% solids paste of benzidine orange (also called Permanent Orange G; cf. Lubs, Chemistry of Synthetic Dyes and Pigments, 1955, page 636). The paper was indistinguishable from corresponding paper made by addition of 100 lb. of the pigment, with addition of the cationic resin but without use of anionic polymer. As little as 1/16 of 1% of the anionic polymer caused a perceptible improvement with this pigment as well.

EXAMPLE 5

The following illustrates the preparation of paper by use of additional polymers.

The procedure of Example 1 was repeated, except that the cationic and anionic polymers used were as shown in the table below.

| Run No. | Percent $TiO_2$ | Cationic Resin | | Anionic Resin | | Remarks |
|---|---|---|---|---|---|---|
| | | Percent | Name | Percent | Name | |
| 1 | 10 | 2 | Methylol-carbamyl-polyaza-alkane.[1] | | None (Control). | Suspension remained milky. |
| 2 | 10 | | do | 1 | AM-AA copolymer.[2] | Complete pigment deposition. |
| 3 | 10 | 2 | do | 1 | U-F bisulfite.[3] | Do. |

[1] Prepared by reacting a higher polyalkylenepolyamine first with potassium cyanate and then with formaldehyde; see Resin C of U.S. Patent No. 2,764,507, granted on September 25, 1956, to Yun Jen et al.
[2] See Example 1.
[3] See Example 4 of U.S. Patent No. 2,582,840, granted on January 15, 1952, to C. S. Maxwell.

EXAMPLE 6

The following illustrates addition of pigment simultaneously with the anionic resin.

A papermaking pulp was prepared at 2% consistency from 100 gm. of fibers (dry basis) and adjusted to pH 4.5, and to this was added with stirring 2.0 gm. (resin solids based on the dry weight of the fibers) of the melamine-formaldehyde acid colloid of Example 1. A pigment-anionic resin slurry was then prepared by adding with vigorous stirring 5.0 gm. of titanium dioxide pigment (papermaking grade) to a solution of 0.5 gm. of the anionic resin of Example 1 in 100 cc. of water. The slurry was slowly run into the fiber suspension with gentle agitation. The pigment was substantially completely deposited on the fibers, after which the fibrous suspension was sheeted to form paper.

I claim:

1. In the manufacture of paper wherein a water-dispersible pigment and a water-soluble cationic resin are added to an aqueous suspension of cellulosic fibers, a part of said pigment is deposited on said fibers by the action of said resin, said fibers are sheeted to form a water-laid web and said web is dried, the improvement of increasing the amount of pigment deposited which comprises adding an effective amount up to about 1%, based on the dry weight of the fibers, of a water-soluble anionic polymer to said suspension subsequent to addition to said cationic resin.

2. A process according to claim 1 wherein the pigment is titanium dioxide.

3. A process according to claim 1 wherein the pigment is chrome yellow.

4. A process according to claim 1 wherein the pigment is barium lithol red.

5. A process according to claim 1 wherein the fibers are rosin-sized fibers.

6. A process according to claim 1 wherein the anionic polymer is an 80:20 to 95:5 molar ratio acrylamide:acrylic acid copolymer.

7. A process according to claim 1 wherein the anionic polymer is a urea-formaldehyde-bisulfite resin.

8. In the manufacture of paper wherein a water-dispersible pigment is added to an aqueous suspension of cellulosic fibers in aqueous suspension, followed by a water-soluble cationic resin, a part of said pigment is deposited on said fibers by the action of said resin, said fibers are sheeted to form a water-laid web and said web is dried, the improvement of increasing the amount of pigment deposited which comprises adding an effective amount up to about 1%, based on the dry weight of the fibers, of a water-soluble anionic polymer to said suspension subsequent to addition of said cationic resin.

9. In the manufacture of paper wherein a water-soluble cationic resin is added to an aqueous suspension of cellulosic fibers in aqueous suspension, followed by a water-dispersible pigment, part of said pigment is deposited on said fibers by the action of said resin, said fibers are sheeted to form a water-laid web and said web is dried, the improvement of increasing the amount of pigment deposited which comprises adding an effective amount up to about 1%, based on the dry weight of the fibers, of a water-soluble anionic polymer to said suspension subsequent to addition of said pigment.

10. In the manufacture of paper wherein a water-soluble cationic resin is added to an aqueous suspension of cellulosic fibers in aqueous suspension followed by a water-dispersible pigment, a part of said pigment is deposited on said fibers by the action of said resin thereon, said fibers are sheeted to form a water-laid web and said web is dried, the improvement of increasing the amount of pigment deposited which comprises adding an effective amount up to about 1%, based on the dry weight of the fibers, of a water-soluble anionic polymer to said suspension simultaneously with said pigment.

References Cited in the file of this patent

UNITED STATES PATENTS

| | | |
|---|---|---|
| 2,601,597 | Daniel et al. | June 24, 1952 |
| 2,658,828 | Pattilloch | Nov. 10, 1953 |
| 2,686,121 | Latham | Aug. 10, 1954 |
| 2,694,633 | Pattilloch | Nov. 16, 1954 |
| 2,730,446 | Hutchins | Jan. 10, 1956 |

UNITED STATES PATENT OFFICE
CERTIFICATE OF CORRECTION

Patent No. 3,021,257            February 13, 1962

Walter H. Stauffenberg

It is hereby certified that error appears in the above numbered patent requiring correction and that the said Letters Patent should read as corrected below.

Column 1, line 9, for "manufacturers" read -- manufacture --; column 2, line 48, for "othewise" read -- otherwise --; column 5, line 16, for "to", third occurrence, read -- of --.

Signed and sealed this 4th day of December 1962.

(SEAL)
Attest:

ERNEST W. SWIDER
Attesting Officer

DAVID L. LADD
Commissioner of Patents